United States Patent [19]

Bethea et al.

[11] 3,988,296

[45] Oct. 26, 1976

[54] CHLORINATED OLEFIN POLYMER COMPOSITIONS STABILIZED WITH ANTIMONY TRIOXIDE

[75] Inventors: James R. Bethea, Denham Springs; Robert G. Bryan, Jr.; S. Douglas Stain, Jr., both of Baton Rouge, all of La.

[73] Assignee: The Dow Chemical Company, Midland, Mich.

[22] Filed: Jan. 9, 1975

[21] Appl. No.: 539,891

Related U.S. Application Data

[63] Continuation-in-part of Ser. No. 474,507, May 30, 1974, abandoned.

[52] U.S. Cl.................... 260/45.75 B; 260/2.5 FP; 260/45.7 R
[51] Int. Cl.².................... C08K 5/03; C08K 5/59
[58] Field of Search ....... 260/45.75 B, 29.6, 2.5 FP, 260/876

[56] References Cited

UNITED STATES PATENTS

| | | | |
|---|---|---|---|
| 3,442,977 | 5/1969 | Grabowski | 260/876 |
| 3,451,960 | 6/1969 | Schmidt | 260/45.75 B |
| 3,547,866 | 12/1970 | Trieschmann | 260/88.2 S |
| 3,648,914 | 2/1972 | Ogawa | 260/2.5 FP |

Primary Examiner—Donald E. Czaja
Assistant Examiner—William E. Parker
Attorney, Agent, or Firm—Ronald G. Brookens

[57] ABSTRACT

Chlorinated olefin polymer compositions having unexpectedly high tensile impact strength values and resistance to ignition and burning are composed essentially of an admixture of (1) a normally solid, linear olefin polymer having a bulk density of from about 22 to about 36 pounds/cubic foot with the individual particles thereof being predominantly in the range of at least 300 to about 800 microns in size, the olefin polymer having from about 1 to about 20 percent by weight of chemically combined chlorine substantially heterogeneously distributed along the outer surfaces of the polymer particles; such chlorine being introduced in the substantial absence of oxygen and at temperatures not substantially exceeding about 90° C. while the olefin polymer particles are maintained in a fluidized bed state; and (2) from about 0.1 to about 10 percent based on polymer weight of antimony trioxide, and, optionally, up to about 5 percent based on polymer weight of certain bromine containing compounds.

5 Claims, No Drawings

CHLORINATED OLEFIN POLYMER COMPOSITIONS STABILIZED WITH ANTIMONY TRIOXIDE

This application is a continuation-in-part of copending application Ser. No. 474,507, filed May 30, 1974, now abandoned.

BACKGROUND OF THE INVENTION

A. Chlorination of Olefin Polymers with Gaseous Chlorine

It has been proposed in U.S. Pat. No. 2,890,213 and British Pat. No. 799,952 to chlorinate solid, finely divided polyethylene, i.e., polyethylene powder wherein the individual particles have a size below 300 microns and predominantly below 80 microns, directly in the vapor phase and without the use of solvent by suspending such powder in a stream of chlorine at temperatures below 100° C. wherein chlorine, in amounts of from about 30 to 65 percent of polymer weight, is substantially heterogeneously distributed along the outer surfaces of the polyethylene particles. The use of such finely divided particles is disclosed as being necessary to achieve adequate rates and amounts of chlorination. Disadvantageously, such finely divided polymer particles produce excessive dust with accompanying atmospheric pollution and explosive hazards. Fluid-bed chlorination of high pressure polyethylene of larger particle size is proposed in U.S. Pat. No. 3,547,866. British Pat. No. 1,228,922 proposes the fluid-bed chlorination of low pressure polyethylene in a mixture of gaseous chlorine and oxygen.

B. Preparation of High Bulk Density Olefin Polymers

High bulk density powders of olefin polymers are also known, e.g., British Pat. No. 960,232 which discloses the preparation of powders having a bulk density exceeding 430 grams per liter by polymerizing an olefin polymer at pressures of 1 to 30 atmospheres, preferably 2 to 4 atmospheres, in the presence of a catalyst compound of a titanium containing catalyst component and diethyl aluminum monochloride or aluminum ethyl sesquichloride.

It has not heretofore been known, however, that relatively large particle size high bulk density linear olefin polymers, i.e., polymer particles ranging from predominantly at least 300 microns to about 800 microns in size and having a bulk density of from about 22 to about 36 pounds/cubic foot, could be sufficiently chlorinated, while in a fluidized bed state, to produce olefin chlorination products which may be produced and handled in the substantial absence of atmospheric pollution and explosive hazards and which, in addition, are useful for a broad range of applications as, e.g., the preparation of flexible film and sheet materials having excellent strength and modulus properties.

C. Addition of Antimony Trioxide to Chlorinated Olefin Polymers

Chlorinated olefin polymers containing antimony trioxide, to enhance fire retardance thereof, are also known, e.g., as described in U.S. Pat. Nos. 3,113,118 and 3,121,067 and the corresponding Canadian Pat. Nos. 667,246 and 676,195. Further, the effect of antimony oxide on the rate of dehydrochlorination of chlorinated polyethylene is discussed in the Journal of Polymer Science: Part A-1, Vol. 10, pp. 881–894 (1972).

It has not heretofore been discovered, however, which discovery represents the present invention, that compositions consisting essentially of certain high bulk density olefin polymer, the individual particles thereof being predominantly in the range of from at least about 300 to about 800 microns in size and containing from about 1 to about 20 percent by weight of chlorine chemically combined therewith in a substantial heterogeneous distribution along the polymer particle, would provide tensile impact values of at least about 20 p.s.i. as determined by ASTM Test No. D-1822-61T; or that such tensile impact values could be substantially maintained even when such polymer was admixed with fire-retarding amounts of antimony trioxide and subjected to elevated temperatures for extended periods of time.

That such discovery could not be predicted from the prior art is established by reference to the previously referred to prior art patents directed to the addition of antimony trioxide to chlorinated olefin polymers wherein the presence of the antimony trioxide is shown to be detrimental to polymer strength properties; and particularly by the referred to article from the Journal of Polymer Science: Part A-1, Vol, 10, pp. 881–894 (1972) wherein it is disclosed that the presence of antimony oxide accelerates the loss of HCl from chlorinated polyethylene, following a short initial induction period.

SUMMARY OF THE INVENTION

The present invention is directed to novel olefin chlorination products having an oxygen index value of at least about 20 as determined by ASTM Test No. D-2863 and a tensile impact strength of at least about 20 p.s.i. as determined by ASTM Test No. D-1822-61T, after aging 14 days at a temperature of 120° C, which products consist essentially of (1) a normally solid, linear olefin polymer powder having a bulk density of from about 22 to about 36 pounds/cubic foot with the individual particles thereof being predominantly in the range of at least 300 to about 800 microns in size, and wherein the olefin polymer contains from about 1 to about 20 percent by weight of chlorine chemically combined therewith such chlorine being substantially heterogeneously distributed along the outer surfaces of the polymer particles, and (2) from about 0.1 to about 10 percent based on polymer weight of antimony trioxide. The invention further encompasses compositions additionally containing up to about 5 percent based on polymer weight of a bromine containing compound selected from the group consisting of hexabromobenzene, hexabromobiphenyl, decabromodiphenyl oxide, as well as a process for preparing the products contemplated by the present invention wherein (1) chlorine is introduced to the olefin polymer in the substantial absence of oxygen while the olefin polymer particles are maintained in a fluidized bed state, while maintaining such chlorination reaction at temperatures not substantially exceeding 90° C., followed by (2) admixing the chlorinated olefin polymer with the antimony trioxide by itself or in combination with the prescribed bromine containing compounds.

DESCRIPTION OF PREFERRED EMBODIMENTS

The term "olefin polymer," as used herein, means polymers of olefins in which the backbone chain of the polymer macromolecule is substantially noncrosslinked and nonbranched and includes polymers of the ethylene, propylene, butene-1 and higher 1-alkenes having 5 to 10 carbon atoms in which polymer the linear main chain has substituent ethylene monomer. As used herein, the term "olefin polymers" is also meant to include homopolymers, copolymers and interpolymers of 1-alkenes and mixtures and blends thereof. The molecular weights of olefin polymers used in the practice of this invention are comparable to those of olefin polymers produced in conventional Ziegler-Natta polymerization processes, e.g., from about 30,000 up to about 3 million or more.

For purposes of this invention, the term "polyethylene" is used to denote preferred olefin polymers and means homopolymers of ethylene and copolymers of ethylene and up to about 5 weight percent of aliphatic, hydrocarbon α-monoolefin such as propylene-1 and butene-1. Such polyethylenes have absolute densities in the range from about 0.90 to about 0.97 g./cc., especially from about 0.950 to about 0.967 g./cc., and melt indexes as determined by ASTM Test No. D-1238-65T(E) in the range from about 0.01 to about 40 decigrams/minute, especially from about 0.1 to about 10 decigrams/minute.

The polyolefins employed in the practice of this invention are in the form of normally extrudable, free flowing powder having a bulk density in the range from about 22 to about 36 pounds/cubic foot, preferably from about 25 to about 32 pounds/cubic foot. The particles of such powder are free flowing, porous particles having individual sizes predominantly within the range from at least 300 to about 800 microns, preferably wherein at least about 90 percent of which are in the range of from 300 to about 600 microns and having generally roughened surfaces resulting from their agglomerate-like structure. Uniquely, the particles of this powder have substantial open or free space within the particles themselves. On the average, as much as about 50 volume percent and as little as about 20 volume percent based on total particle volume is free or open space occurring as pockets within the particles and as pores or openings on the particle surfaces. Preferred polyethylene powders have flowability measured as angle or repose in the range from about 24° to about 28° and an open space (or free volume) within individual particles in the range of from about 25 to about 45 volume percent based on total particle volume. Especially preferred powders also have surface areas in the range from about 2 to 4 square meters/gram.

For commercial purposes, the chlorination of such olefin polymers may be effected in various ways. It is possible, for example, to agitate the granular polymer by means of stirring devices while exposing it to the action of a current of chlorine, in the substantial absence of oxygen, wherein the chlorine has preferably been preheated.

It is particularly advantageous to effect the chlorination by a fluidized process wherein the olefin polymer is maintained, with substantially complete mixing occurring within a period of about 10 seconds, in a fluidized bed state, e.g., by means of the gas used for the chlorination and wherein the temperature of reaction does not substantially exceed 90° C. It is to be understood that the chlorine gas may be diluted with inert gases, if desired, and that the incoming fluidizing gas and/or the olefin polymer particles may be preheated. It has been found, however, that the presence of substantial amounts of oxygen during the chlorination reaction will significantly deleteriously affect the rate and degree of chlorination as well as the physical properties of the resulting chlorinated material.

The following examples illustrate the invention but should not be considered as limiting its scope. All parts and percentages are by weight unless otherwise indicated.

EXAMPLE 1

A. Preparation Of High Bulk Density Polyethylene Powder

A polyethylene powder having a bulk density of about 30 lbs/ft.$^3$ was obtained by polymerizing ethylene under low pressures, i.e., less than about 30 atmospheres, and a slurry polymerization temperature of less than about 100° C. in the presence of trialkyl aluminum and a titanium containing component which had been prepared from titanium tetrachloride and diethyl aluminum monochloride. In preparation of the titanium-containing catalyst, titanium tetrachloride, dissolved in an inert hydrocarbon solvent, was reacted using thorough stirring with diethyl aluminum monochloride also dissolved in inert hydrocarbon solvent in a manner such that the molar ratio of titanium tetrachloride to diethyl aluminum monochloride was at any time prior to reaction of all titanium tetrachloride at least 1; the reaction product was then washed with inert hydrocarbon solvent and filtered to remove hydrocarbon-solvent-soluble impurities; and the washed reaction product activated by adding trialkyl aluminum in amount such that the molar ratio of trialkyl aluminum and titanium-containing reaction product was from about 0.3:1 to about 3:1 in the resulting catalyst. The polymerization mixture was agitated at a rate of about 140 RPM. A polymer product in the form of a slurry was withdrawn from the reactor and the polymer particles thereof recovered (by steam distillation and drying in an air slick). Examination of the polymer particles with an electron scanning micrograph confirmed all of such particles as being generally porous, partially fused agglomerates of much smaller particles, the agglomerates having rough surfaces. Screen analysis of the polymer particles indicates a particle size distribution in weight percent of total powder at the designated particle size as follows:

1.6–14.3% greater than 540 microns
72.3–87.6% from about 320 to about 540 microns
4.7–20.1% from about 248 to about 320 microns
0.8–3.3% from about 175 to about 248 microns
0.1–0.6% from about 147 to about 175 microns
0.2–1.2% less than about 147 microns B. Chlorination of the High Bulk Density Polyethylene Powder The high bulk density polyethylene powder was chlorinated by fluidizing such material in a suitable container by passing an inert gas (nitrogen or other gas) through the material, in the substantial absence of oxygen, then adding chlorine to the fluidizing gas. In each instance, the reaction was conducted at a temperature not exceeding 90° C. for a time sufficient to provide about 8 percent by weight of chemically combined chlorine on the polymer particles. Examination of electron photomicrographs of the resulting polymeric material established that the chlorine was heterogeneously attached substantially to the outer surfaces of the polyethylene polymer particles.

For purposes of comparison, separate samples of the high bulk density polyethylene described in (A) above were admixed with a low molecular weight chlorinated paraffin containing about 70 percent chlorine (Chlorowax), in an amount sufficient to provide a mixture containing a total of about 8 percent chlorine (Comparison A). In another comparison, a suspension chlorinated polyethylene of conventional bulk density containing about 13 percent of chemically combined chlorine was employed (Comparison B).

C. Addition of Antimony Trioxide and Testing of the Resulting Admixtures

Varying amounts of antimony trioxide were admixed with the above designated chlorine containing polyethylene powders. The resulting admixtures were then tested to determine the oxygen index (ASTM Test No. D-2863) as a measure of resistance to ignition and burning. Such samples were also tested for tensile impact strength (ASTM Test No. D-1822-61T) following varying periods of exposure in a circulating air oven operating at a temperature of about 120° C. The following Table I sets forth the mixtures used, the testing conditions employed and the results obtained.

7.6 percent. Thereafter a series of fire-retarding agents were dry blended with such chlorinated polyethylene and the resulting admixtures tested to determine the oxygen index and tensile impact strength thereof in the manner as set forth in Example 1, part C. The following Table II sets forth the admixtures used, the testing conditions employed and the results obtained.

TABLE II

| Exp. No. | Additive Type | Amt. (pts by wt.) | Oxygen Index | Tensile Impact (psi) (Days Aging at 120° C) | | |
|---|---|---|---|---|---|---|
| | | | | 0 | 7 | 14 |
| (For Comparison) | | | | | | |
| 7 | — None | — | 19.5 | 27.0 | 20.1 | 8.2 |
| 8 | $Sb_2O_5$ | 2.5 | 26.5 | 20.1 | 3.7 | 3.1 |
| 9 | Zinc Borate | 3.2 | 21.5 | 15.9 | 6.6 | 4.1 |
| 10 | Alumina Trihydrate | 5 | 20.5 | 15.1 | 0.9 | 0 |
| (The Invention) | | | | | | |
| 11 | $Sb_2O_3$ | 1 | 25 | 24.7 | 24.1 | 25.1 |
| 12 | $Sb_2O_3$ | 2 | 26 | 26 | 25 | — |
| 13 | $Sb_2O_3$ | 5 | 25.5 | 19.5 | 21.9 | 19.3 |
| 14 | $Sb_2O_3$ plus DBDO (*) | 2 / 2 | 27.5 | 23.5 | 21.0 | 19.4 |
| 15 | $Sb_2O_3$ plus HBB (*) | 2 / 2 | 27.5 | 26.3 | 26.5 | 24.3 |
| 16 | $Sb_2O_3$ plus HBB (*) | 2 / 5 | 27.5 | 27.8 | 21.9 | 21.9 |
| 17 | $Sb_2O_3$ plus HBBP (*) | 2 / 2 | 27.5 | 26.6 | 25.5 | 23.9 |
| 18 | $Sb_2O_3$ plus HBBP (*) | 2 / 5 | 27.5 | 26.6 | 25.5 | 23.9 |
| 19 | $Sb_2O_3$ plus HBBP (*) | 5 / 5 | 27.5 | 24.5 | 24.9 | 23.7 |

(*) DBDO decabromodiphenyl oxide
(*) HBB hexabromobenzene
(*) HBBP hexabromobiphenyl The above comparative data illustrate that the compositions of the present invention are desirably resistant to ignition and burning and, in addition, provide unusually high tensile impact strength values, which values are unexpectedly maintained or improved even when such compositions are subjected to elevated temperatures for extended periods of time.

What is claimed is:

1. A composition of matter having an oxygen index

TABLE I

| Exp. No. | Sample Identification | Total % Cl | $Sb_2O_3$ | Index $O_2$ | Tensile Impact (psi) Days Aging at 120° C | | | |
|---|---|---|---|---|---|---|---|---|
| | | | | | 0 | 7 | 14 | 21 |
| | Series I | | | | | | | |
| 1 | Comparison A (addition of Clorowax) | 8 | 0 | 21.5 | 2.6 | 1.7 | 0 | 0 |
| 2 | Comparison A (addition of Clorowax) | 8 | 5 | 23.5 | 2.0 | 0 | 0 | 0 |
| 3 | Comparison B (Suspension Chlorination) | 13 | 9.4 | 24 | 10.0 | 4.6 | 5.7 | 4.9 |
| | Series II | | | | | | | |
| 4 | The Invention (fluid-bed-chlorination) | 8 | 0.1 | 20.5 | 26.0 | 25.7 | 23.7 | 0 |
| 5 | The Invention (fluid-bed-chlorination) | 8 | 5 | 24.5 | 22.2 | 23.2 | 21.3 | 22.8 |
| 6 | The Invention (fluid-bed-chlorination) | 8 | 10 | 25.0 | 14.9 | 19.6 | 21.8 | 21.9 |

EXAMPLE 2

In each of a series of additional experiments a high bulk density polyethylene powder as described in Example 1, part A was chlorinated in the manner described in Example 1, part B to a chlorine content of value of at least about 20 as determined by ASTM Test No. D-2863 and a tensile impact strength of at least about 20 p.s.i. as determined by ASTM Test No. D-1822-61T after aging 14 days at a temperature of 120° C. said composition consisting essentially of a substantially uniform admixture of (1) a resinous material consisting of a normally solid, linear olefin polymer powder having a bulk density of from about 22 to about 36 pounds/cubic foot the individual particles thereof being predominantly in the range of from at least 300 to about 800 microns in size said olefin polymer containing from about 1 to about 20 percent by weight of chlorine chemically combined therewith said chlorine being substantially heterogeneously distributed along the outer surfaces of said particles and wherein the chlorination is accomplished by reacting the non-chlorinated olefin polymer with gaseous chlorine in the substantial absence of oxygen at temperatures not substantially exceeding 90° C. while holding said olefin polymer in a fluidized bed state, and (2) from about 0.1 to about 10 percent of antimony trioxide based on the weight of (1).

2. The composition of claim 1 wherein said olefin polymer is polyethylene.

3. The composition of claim 2 wherein said polyethylene has a bulk density of from about 25 to 32 pounds/cubic foot.

4. The composition of claim 3 wherein at least about 90 percent of the individual particles of said polyethylene are in the range of from 300 to 600 microns in size.

5. The composition of claim 4 containing in addition thereto and in combination therewith up to about 5 percent based on polymer weight of a bromine containing compound selected from the group consisting of hexabromobenzene, hexabromobiphenyl and decabromodiphenyl oxide.

* * * * *